United States Patent
Wu et al.

(10) Patent No.: US 9,971,790 B2
(45) Date of Patent: May 15, 2018

(54) GENERATING DESCRIPTIVE TEXT FOR IMAGES IN DOCUMENTS USING SEED DESCRIPTORS

(71) Applicant: GOOGLE LLC, Mountain View, CA (US)

(72) Inventors: Yonghui Wu, Mountain View, CA (US); Michael E. Flaster, Menlo Park, CA (US); Randall G. Keller, Palo Alto, CA (US); Paul Haahr, San Francisco, CA (US)

(73) Assignee: Google LLC, Mountain View, CA (US)

( * ) Notice: Subject to any disclaimer, the term of this patent is extended or adjusted under 35 U.S.C. 154(b) by 402 days.

(21) Appl. No.: 14/211,487

(22) Filed: Mar. 14, 2014

(65) Prior Publication Data
US 2015/0161086 A1    Jun. 11, 2015

Related U.S. Application Data

(60) Provisional application No. 61/788,296, filed on Mar. 15, 2013.

(51) Int. Cl.
*H04N 21/84*    (2011.01)
*H04N 21/431*    (2011.01)
(Continued)

(52) U.S. Cl.
CPC .... *G06F 17/30247* (2013.01); *G06F 3/04842* (2013.01); *G06F 17/211* (2013.01);
(Continued)

(58) Field of Classification Search
CPC ................................................ G06F 17/30247
(Continued)

(56) References Cited

U.S. PATENT DOCUMENTS 8,065,611 B1 * 11/2011 Chan ................... G06F 17/3028
                                                                382/305
8,346,792 B1 *  1/2013 Baker ............... G06F 17/30389
                                                                707/759
(Continued)

OTHER PUBLICATIONS

Chowdhury, "Template Mining for Information Extraction from Digital Documents," Library Trends, 1999, 48(1):182-208.
(Continued)

*Primary Examiner* — Cesar Paula
*Assistant Examiner* — Luu-Phuong Nguyen
(74) *Attorney, Agent, or Firm* — Fish & Richardson P.C.

(57) ABSTRACT

Methods, systems, and apparatus, including computer programs encoded on a computer storage medium, for generating descriptive text for images. In one aspect, a method includes identifying a set of seed descriptors for an image in a document that is hosted on a website. For each seed descriptor, structure information is generated that specifies a structure of the document with respect to the image and the seed descriptor. One or more templates are generated for each seed descriptor using the structure information for the seed descriptor. Each template can include image location information, document structure information, image feature information, and a generative rule that generates descriptive text for other images in other documents. Descriptive text for other images is generated using the templates and the other documents. The descriptive text is associated with the images.

17 Claims, 7 Drawing Sheets

(51) Int. Cl.
*H04N 21/4782* (2011.01)
*H04N 21/4725* (2011.01)
*G06F 17/30* (2006.01)
*G06F 17/27* (2006.01)
*G06F 3/0484* (2013.01)
*G06F 17/21* (2006.01)

(52) U.S. Cl.
CPC ........ *G06F 17/2785* (2013.01); *G06F 17/212* (2013.01); *G06F 17/30011* (2013.01); *G06F 17/30047* (2013.01); *G06F 17/30253* (2013.01); *G06F 17/30289* (2013.01); *G06F 17/30876* (2013.01)

(58) Field of Classification Search
USPC ......................................... 715/234
See application file for complete search history.

(56) References Cited

U.S. PATENT DOCUMENTS

| | | | | |
|---|---|---|---|---|
| 8,385,589 | B2* | 2/2013 | Erol | G06K 9/00456 382/100 |
| 8,850,308 | B1* | 9/2014 | Roselander | G06Q 10/06398 705/7.38 |
| 2002/0143659 | A1* | 10/2002 | Keezer | G06Q 30/0641 705/27.1 |
| 2003/0103071 | A1* | 6/2003 | Lusen | G06F 17/241 715/705 |
| 2007/0078726 | A1* | 4/2007 | MacDonald Korth | G06Q 10/06 705/26.1 |
| 2007/0168382 | A1* | 7/2007 | Tillberg | G06F 17/30253 |
| 2008/0098300 | A1* | 4/2008 | Corrales | G06F 17/30896 715/243 |
| 2010/0017289 | A1* | 1/2010 | Sah | G06Q 30/02 705/14.49 |
| 2010/0169311 | A1* | 7/2010 | Tengli | G06F 17/30864 707/736 |
| 2010/0268702 | A1* | 10/2010 | Wissner | G06F 17/30705 707/711 |
| 2011/0096174 | A1* | 4/2011 | King | G06F 21/31 348/207.1 |
| 2014/0146053 | A1* | 5/2014 | Cragun | G06F 17/30247 345/467 |

OTHER PUBLICATIONS

Crescenzi and Mecca, "Automatic Information Extraction from Large Websites," J ACM, Sep. 2004, 51(5):731-779.

Fauzi et al., "Webpage Segmentation for Extracting Images and Their Surrounding Contextual Information," MM'09, Oct. 19-24, 2009, pp. 649-652.

Schmitz et al., "Open Language Learning for Information Extraction," Proceeding EMNLP-CoNLL '12, 2012, 12 pages.

* cited by examiner

GENERATING DESCRIPTIVE TEXT FOR IMAGES IN DOCUMENTS USING SEED DESCRIPTORS

CROSS REFERENCE TO RELATED APPLICATION

This application claims the benefit under 35 U.S.C. § 119(e) of U.S. Provisional Patent Application No. 61/788,296 filed on Mar. 15, 2013, entitled "GENERATING DESCRIPTIVE TEXT FOR IMAGES," the entire content of which is hereby incorporated by reference.

BACKGROUND

This specification relates to generating descriptive text for images.

The Internet provides access to a wide variety of documents, such as image files, audio files, video files, and web pages. A search system can identify documents in response to a text query that includes one or more search terms or phrases. The search system ranks the documents based on their relevancy to the search query and importance and provides search results that link to the identified documents. The search results are typically ordered for viewing according to the rank.

For searches directed to images, the search system can identify images that are relevant to a search query based, in part, on text associated with the image. For example, an image may have one or more labels that include text associated with the image. The labels may be from metadata for the image, or may be text presented near an image on a document, such as a web page.

SUMMARY

In general, one innovative aspect of the subject matter described in this specification can be embodied in methods that include the actions of identifying a set of seed descriptors for an image in a document that is hosted on a website; generating, for each seed descriptor, structure information that specifies a structure of the document with respect to the image and the seed descriptor; generating, for each seed descriptor, one or more templates using the structure information for the seed descriptor, each template including: image location information specifying a location of the image within the document; document structure information specifying the structure of the document with respect to the image and the seed descriptor; image feature information specifying one or more feature values of the image, each feature specifying a visual characteristic of the image or data regarding an image file in which the image is stored; and a generative rule that generates descriptive text for other images in other documents; for each of the other images: generating descriptive text for the other image using the templates and the other document; and associating the descriptive text with the other image. Other embodiments of this aspect include corresponding systems, apparatus, and computer programs, configured to perform the actions of the methods, encoded on computer storage devices.

These and other embodiments can each optionally include one or more of the following features. The document structure information can include text location information that specifies a location of a string of text within the document. The string of text can include at least one term that matches a term of the seed descriptor.

Each template can further include text information that specifies a first portion of the string of text and a wildcard for a second portion of the string of text. The second portion of the string of text can correspond to the at least one term that matches at least one of the terms of the template's corresponding seed descriptor. The first portion of the string of text can be text that does not match a term of the seed descriptor.

The seed descriptors can be text data including one or more terms. Generating the structure information for a particular seed descriptor can include identifying at least one term of the particular seed descriptor within the document; identifying a string of text that includes the at least one term of the particular seed descriptor; and generating the document structure information based on the location of the string of text within the document.

The document structure information can include text location information that identifies the location of the string of text with respect to the image. Generating descriptive text for a particular image in a particular document can include determining that the particular document has a structure that matches a particular template by applying the particular template to the particular document; identifying a particular string of text within the particular document, the particular string of text being located within the particular document at a location that corresponds to the text location information of the particular template; and generating the descriptive text for the particular image using the particular string of text.

Determining that the particular document has a structure that matches the particular template can include determining that the particular image is located within the particular document at a location that matches the location of the image within the document; determining that particular string of text is located within the particular document at a location that matches the location of the string of text within the document; and determining that the particular image includes one or more features that match the one or more features of the image.

Generating, for each seed descriptor, one or more templates using the structure information for the seed descriptor can include generating candidate templates using the structure information for the seed descriptors; for each candidate template: determining a number of appearance of the candidate template in documents hosted on the website; determining whether the number of appearances meets a template threshold; and designating the candidate template as a template in response to determining that the number of appearances meets the template threshold. Aspects can further include determining that the candidate template appears in a particular document by identifying a structure in the particular document that matches the structure information of the candidate template.

The structure of the document can include at least one embedded coding fragment, each embedded coding fragment being a hypertext markup language (HTML) tag pair that encloses the image or the string of text. The one or more features of the image can include at least one of an aspect ratio for the image, a display size for the image, a shape of the image, or data identifying cropping of the image.

The one or more features of the image can include at least one of a file name for the image or a file type for the image. The seed descriptors can include seed queries that are queries that have at least a threshold performance with respect to the image. The other documents can be hosted on the website.

Particular embodiments of the subject matter described in this specification can be implemented so as to realize one or more of the following advantages. Text that describes an image can be generated from text in a document that includes the image. This descriptive text can be generated by applying to the document templates that identify the location of descriptive text for an image included in the document. The descriptive text generated for an image can be associated with the image and used in image search operations to better surface and rank relevant images. Thus, the user experience for an image search engine may be improved by presenting more relevant images.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1:
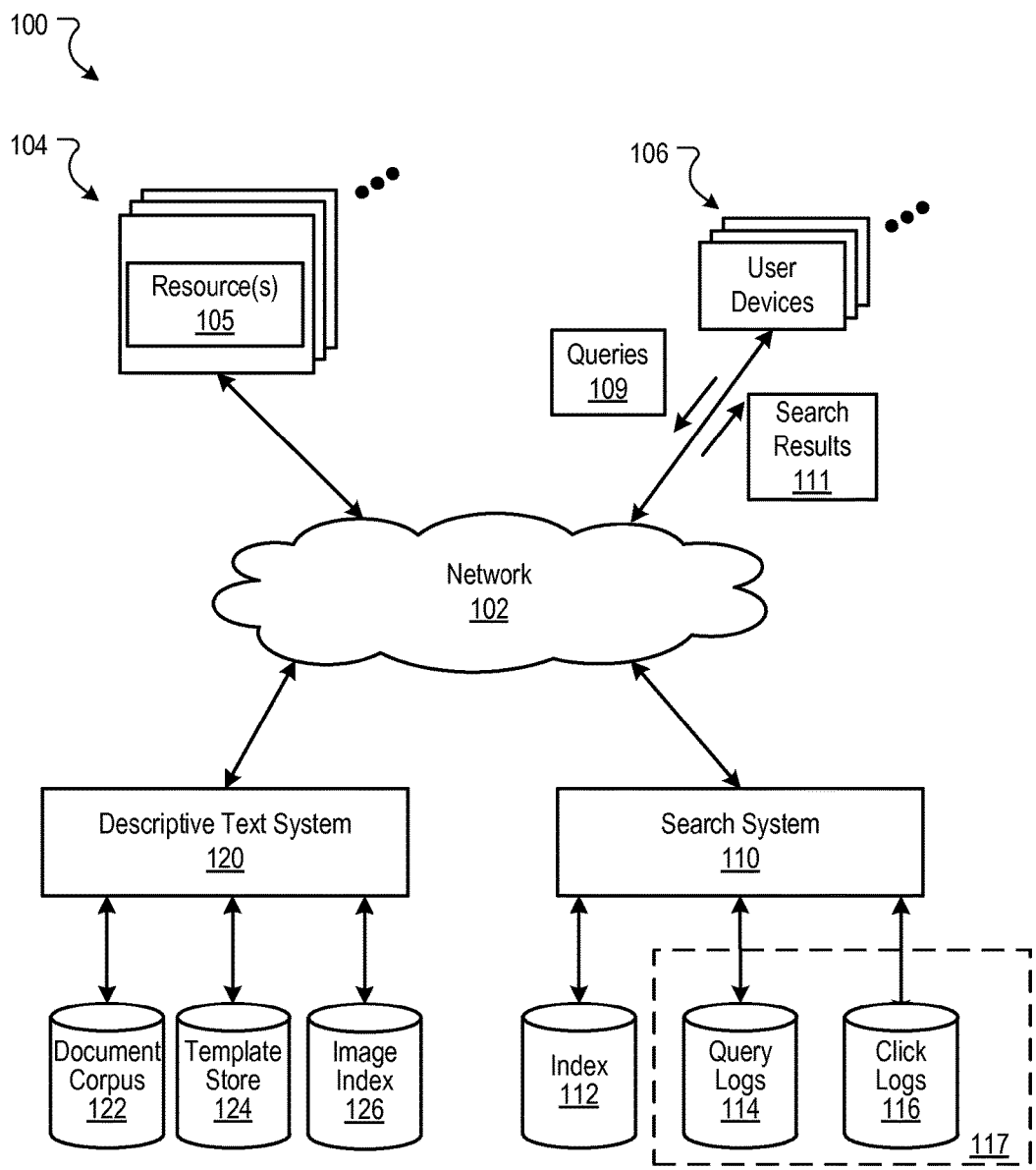
FIG. 1 is a block diagram of an example environment in which a search system provides search services.

A system can use templates to generate descriptive text for images included in documents, such as images included in web page documents. For example, web pages hosted on a website may include an image and descriptive text for the image. The descriptive text may be located in a common location on several of the web pages. For example, the descriptive text for an image may be located under the image, or to one side of the image on many of the web pages. The system can identify this document structure and use the structure to generate templates that can be used to extract descriptive text for other images hosted on the same website, or included in or linked to from other documents.

The system can generate a template using a particular document that includes an image, and seed descriptors (e.g., seed queries or labels) for the image included in the document. The system can identify a string of text within the document that includes at least one term of a seed descriptor. As this identified string of text may be descriptive of the image, the location of the string of text may be useful in identifying descriptive text for other images in other documents that have a similar structure as the particular document.

In some implementations, a template includes image location information that specifies the location of the image within the document, document structure information specifying the structure of the document with respect to the image and the seed descriptor, and/or image feature information that specifies one or more feature values for features of the image. The document structure information may include text location information that specifies the location of the string of text, for example with respect to the image. For example, the text location information may specify that the string of text is located below the image or to one side of the image.

The image feature values can specify visual characteristics of the image and/or data regarding an image file that stores the image. For example, the visual characteristics for an image can include an aspect ratio for the image, a display size for the image, a shape of the image, or data identifying cropping of the image. Templates are sometimes more useful in generating descriptive text for images if the templates are limited to images with certain visual characteristics, such as templates with images having a certain aspect ratio.

In some implementations, a template includes document-level characteristics. An example of a document-level characteristic is a most-commonly occurring entity, such as a most commonly-occurring word or phrase in the document. A template may specify that the most commonly occurring entity in the document should be used as descriptive text for one or more images included in the document.

A template can also include a literal, such as a fixed string of text. The template may also specify that the location of the literal in the document does not matter. For example, consider a website that hosts images of sunsets. An example template for this website may associate the descriptive text "sunset" with each image on the website. Another example template for this website may add the descriptive text "sunset" to the location of each image, based on a structural feature of the document.

The system can apply a template to a document when the document has a structure that matches the template. In general, a document has a structure that matches a template if the document includes an image that is located within the document at a location that matches the image location of the template, and also includes text that meets requirements (e.g., structural and/or other requirements) of a text-generating portion of the template. In some implementations, for the document to have a structure that matches the template, the image of the document must also have one or more features that match the one or more image features of the template. For example, if the template specifies a certain size image, the image of the document may have to be the same or a similar size for the document to be considered to have a structure that matches the template.

If the document has a structure that matches the template, the system may generate descriptive text for the document's image from text included in the document or other test related to the document (e.g., metadata of the document or metadata of the image included in the document. For example, the system may identify text within the document that is located at the location specified by the template and use the identified text to generate the descriptive text. The descriptive text may then be associated with the image, for example as a label for the image.

Example Operating Environment

FIG. 1 is a block diagram of an example environment 100 in which a search system 110 provides search services. A computer network 102, such as a local area network (LAN), wide area network (WAN), the Internet, or a combination thereof, connects publisher web sites 104, user devices 106, and the search system 110. The online environment 100 may include many thousands of publisher web sites 104 and user devices 106.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a content publisher, which is an entity that controls, manages and/or owns the website 104.

A resource 105 is any data that can be provided by the publisher 104 over the network 102 and that is associated with a resource address. Resources 105 include HTML pages, word processing documents, and portable document format (PDF) documents, images, video, and feed sources, to name just a few. The resources 105 can include content, such as words, phrases, pictures, and so on, and may include embedded information (such as meta information and hyperlinks) and/or embedded instructions (such as scripts).

A user device 106 is an electronic device that is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a web page at a website on the world wide web or a local area network.

Search Processing

To facilitate searching of resources 105, the search system 110 identifies the resources by crawling the publisher web sites 104 and indexing the resources 105 provided by the publisher web sites 104. The indexed and, optionally, cached copies of the resources 105, are stored in an index 112.

The user devices 106 submit search queries 109 to the search system 110. The search queries 109 are submitted in the form of a search request that includes the search request and, optionally, a unique identifier that identifies the user device 106 that submits the request. The unique identifier can be data from a cookie stored at the user device, or a user account identifier if the user maintains an account with the search system 110, or some other identifier that identifies the user device 106 or the user using the user device.

In response to the search request, the search system 110 uses the index 112 to identify resources that are relevant to the queries. The search system 110 identifies the resources in the form of search results 111 and returns the search results 111 to the user devices 106 in a search results page resource. A search result is data generated by the search system 110 that identifies a resource that satisfies a particular search query, and includes a resource locator for the resource. An example search result can include a web page title, a snippet of text extracted from the web page, and the URL of the web page.

The search results 111 are ranked based on scores related to the resources identified by the search results 111, such as information retrieval ("IR") scores, and optionally a separate ranking of each resource relative to other resources, e.g., an authority score. The search results are ordered according to these scores and provided to the user device according to the order.

The user devices 106 receive the search results pages and render the pages for presentation to users. In response to the user selecting a search result at a user device 106, the user device 106 requests the resource identified by the resource locator included in the selected search result. The publisher of the web site 104 hosting the resource receives the request for the resource from the user device 106 and provides the resource to the requesting user device 106.

In some implementations, the queries 109 submitted from user devices 106 are stored in query logs 114. Click data for the queries and the web pages referenced by the search results are stored in click logs 116. The query logs 114 and the click logs 116 define search history data 117 that include data from and related to previous search requests associated with unique identifiers. The click logs define actions taken responsive to search results provided by the search system 110. The query logs 114 and click logs 116 can be used to map queries submitted by the user devices 106 to web pages that were identified in search results and the actions taken by users (i.e., that data are associated with the identifiers from the search requests so that a search history for each identifier can be accessed). The click logs 116 and query logs 114 can thus be used by the search system 110 to determine the sequence of queries submitted by the user devices 106, the actions taken in response to the queries, and how often the queries are submitted.

Descriptive Text System

The example environment 100 also includes a descriptive text system 120 that generates descriptive text for images and associates the descriptive text with the images. The search system 110 can use the descriptive text in image search operations. For example, the search system 110 may compare received search queries to descriptive text for images to identify images that are responsive to the queries. The search system 110 may also use the descriptive text in an image ranking process.

To generate the descriptive text for images, the descriptive text system 120 can analyze data from a document corpus 122. The document corpus 122 can include documents and/or data about documents that each includes at least one image. The documents in the document corpus 122 can include static documents, e.g., documents in Hypertext Markup Language (HTML) or Extensible Markup Language (XML) format; dynamic documents, e.g., document dynamically generated using Java Server Pages (JSP) or PHP: Hypertext PreProcessor (PHP) technologies; or both.

The descriptive text system 120 can generate templates for use in identifying and generating descriptive text for images as described in detail below. Once created, the descriptive text system 120 stores the templates in a template store 124. To generate descriptive text for images, the descriptive text system 120 can access the templates in the template store 124 and apply the templates to documents that include one or more images, such as documents stored in the document corpus 122.

The descriptive text system 120 stores descriptive text for images in an image index 126. The image index 126 can include data identifying images and, for each image, descriptive text for the image. The image index 126 can be provided to, or accessed by, the search system 110 to support image search operations. The image index 126 can also include seed descriptors for at least some of the images. As described in more detail below, the seed descriptors are used to generate templates for generating descriptive text for other images.

Descriptors

In general, a seed descriptor for an image includes text related to or descriptive of the image. For example, the seed descriptor for an image may describe the subject of or objects depicted in the image. To illustrate, the seed descriptors for an image of a famous actor captured from video of one of the actor's movies may include the actor's name and the name of the movie.

The seed descriptors for an image may be identified in various ways and from various sources. For example, a user may provide the seed descriptors for an image based on what the user sees in the image. Image labels may also be used to identify seed descriptors for an image. For example, image labels may be stored as metadata with the image. These labels can be extracted and used to create seed descriptors for the image.

In some implementations, the seed descriptors are "seed queries" for the images. In general a seed query for an image may be a query for which the image performs well. That is, the seed query may be a query for which the image is selected at least a threshold frequency when the image is referenced by a search result for the query.

In some implementations, an image classification technology can be used to generate seed descriptors for an image based on visual features of the image. In general, an image classification technology may be one or more models that have been trained to classify images into categories using visual features of training images. The model(s) may be applied to visual features of an input image to classify the input image into one or more categories. These categories can be used as, or used to generate the seed descriptors for the input image. For example, each category to which the image is classified may be deemed a seed descriptor for the image.

The images for which seed descriptors are generated may be images that are included in one or more documents, such as web page documents. The seed descriptors may be stored in the image index 126 with a reference to its image and/or the document(s) in which the image is included. For example, the image index 126 may include descriptor-document-image tuples. Each descriptor-document-image tuple identifies an image, a seed descriptor for the image and a document in which the image is included. An image may be associated with multiple descriptor-document-image tuples as the image may have multiple seed descriptors and/or be included in multiple documents.

Descriptive Text Workflow

Figure 2:
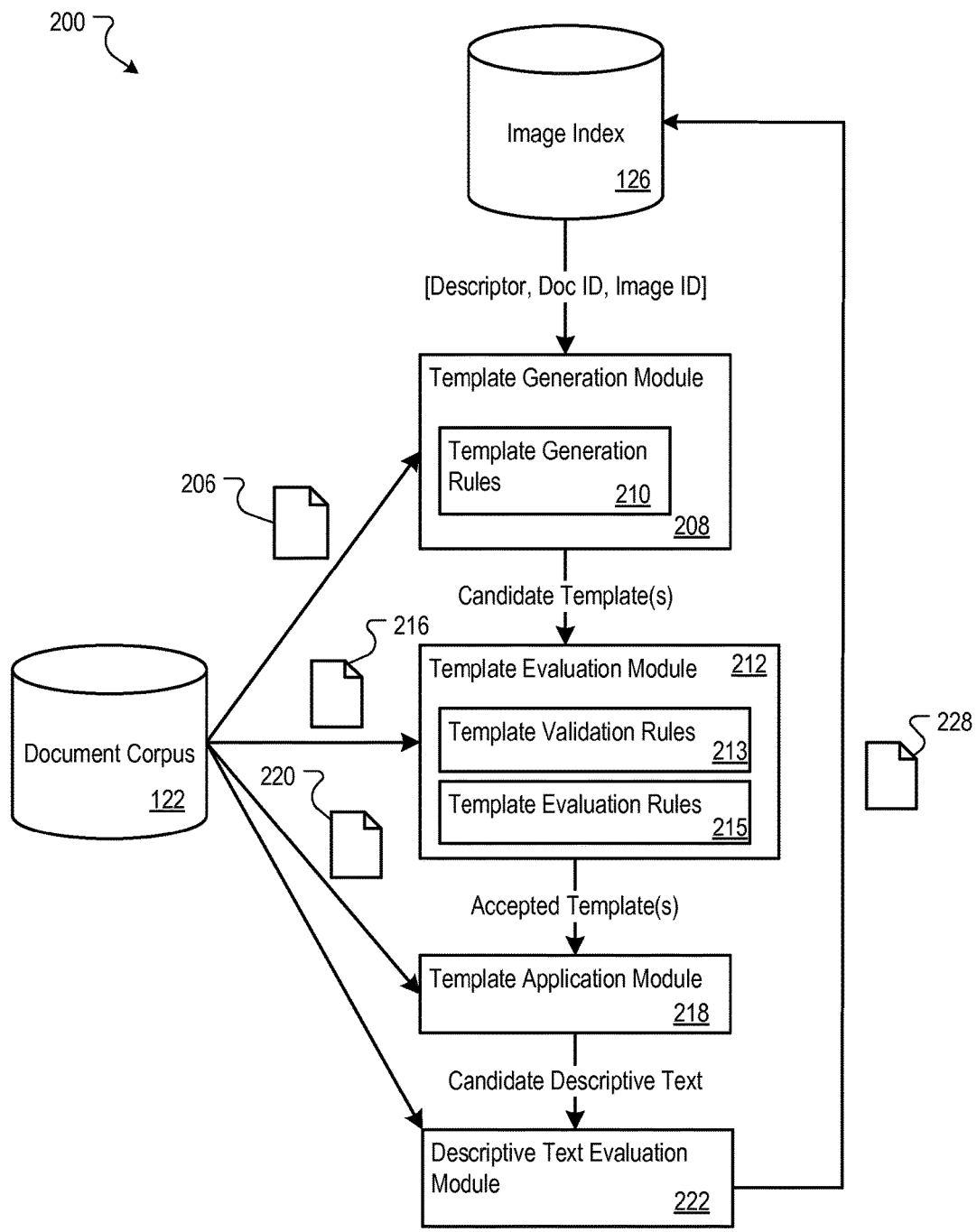
FIG. 2 is a block diagram of example modules and an example workflow of a descriptive text system.

FIG. 2 is a block diagram of example modules and an example workflow of a descriptive text system 200. A template generation module 208 accesses the image index 126 and retrieves seed descriptors for images. For example, the template generation module 208 may retrieve descriptor-document-image tuples that each identifies an image, a seed descriptor for the image, and a document in which the image is included.

In some implementations, the template generation module 208 retrieves descriptor-document-image tuples for documents having common traits. For example, the template generation module 208 may retrieve descriptor-document-image tuples for documents that are hosted on the same website. Other traits can also be used. For example, a common trait can be that the documents are from the same publisher, from the same author, included in the same journal, or from the same time period. The restriction to documents having common traits can improve the chances that the generated descriptive text is useful.

The template generation module 208 retrieves documents 206 identified by the retrieves descriptor-document-image tuples, e.g., from the document corpus 122, and generates one or more candidate templates using the seed descriptors, documents, and images of the retrieved descriptor-document-image tuples. To generate the candidate templates, the template generation module 208 applies a set of template generation rules 210 to the seed descriptors, the documents 206, and the images. For example, a template generation rule 210 can require that at least a portion of a seed descriptor appear in certain HTML tags embedded in the document, e.g., a <figure> </figure> tag pair or a <figcaption> </figcaption> tag pair. Another rule can require that at least a portion of the seed descriptor appear multiple times or at least a threshold number of times in the document.

In general, a template (and a candidate template) can be based on the structure of a document with respect to an image included in the document and text that matches a seed descriptor for the image. As the structure of documents may be similar, the template can be used to identify descriptive text in other documents having a similar structure with respect to images included in the other documents. A template can also be based on document-level characteristics of a document and/or literals irrespective of location of the literal in the document.

A "structure" of a document, such as a structured document, is defined by particular formatting elements based on which the document is organized. The structure can include markups of the document. For example, the structure can include metadata of the content, e.g., an annotation of a segment in the document that includes information of the segment. A structure in an HTML document can include a tag structure, as well as some or all text fragments in the tag structure. The structure can have various forms, including hierarchical forms in which tags are nested in another tag.

The template generation module 208 can generate templates by identifying structure information for a document and generating the template based on the identified structure. The structure information can include image location information that identifies a location of the image in the document, document structure information specifying how text should be extracted from an appropriately structured document, and/or image feature information that specifies feature values for features of the image.

The image location information can specify a section of the document that contains the image, such as the body of a document or a particular frame of a web page. The image location information may also specify vertical location information, e.g., top, center, bottom, and/or horizontal location information, e.g., left, middle, right, for the image with respect to the document. The location information may also be in terms of a number of pixels from reference points, such as from the top and from the left of the document.

The document structure information can specify the structure of the document with respect to the image and the seed descriptor. The document structure information may include text location information that specifies the location of a string of text that includes a term of the seed descriptor, e.g., a string of text that matches the seed descriptor. For example, the document structure information may include data specifying tag pairs, text fragments contained in the tag pairs, and the location of the tag pairs and text fragments. The location information of the tag pairs and text fragments can be with respect to the image. For example, the text location information may specify that the text that matches the seed descriptor is contained in "<figcaption>" tags and is located directly below the image, or 100 pixels below the image.

By way of example, a particular seed descriptor contains the terms "Baseball Player." The particular seed descriptor is associated with a particular HTML document, e.g., a web page. The HTML document contains an embedded coding fragment "<figcaption>Image of Baseball Player</figcaption>" located under an image of the player. The template generation module 208 can search the document for the seed descriptor and identify that the text "Baseball Player" contained in the "<figcaption>" tag pair matches the seed descriptor. Based on this identification, the template generation module 208 can generate document structure information that specifies that text matching the seed descriptor is found in "<figcaption>" tags located below the image.

The template generation module 208 can also identify a text fragment "Image of" that is located immediately to the left of the text that matches the seed descriptor. The text fragment can be used to generate a template as it may be a signal that descriptive text follows the fragment. For example, another document may include the text "Image of Example Hockey Player" in the caption for an image of a hockey player. The text "Image of" can be used to identify, as descriptive text, "Example Hockey Player" for the image.

The image feature information specifies one or more feature values for features of the image. The features may pertain to visual characteristics of an image. For example, a feature may be a visual characteristic of a portion of an image, such as color, histograms of image color or grayscale data, texture, edges, corners, geometric information, image centers of gravity, and other characteristics of a portion of the image. A feature value is a value indicative of a corresponding visual characteristic of a portion of an image. For example, a content feature value of a color content feature may be a value indicative of the color green at a particular location or three values indicative of the average color for a region. The features of the image may also include the height, width, resolution, and/or aspect ratio or other features of the image.

In addition, or in the alternative, the image feature information may specify data regarding an image file in which the image is stored. For example, the image feature information may specify that a particular image is stored in a JPEG file format and/or the size of the file, e.g., in bytes.

In some implementations, each candidate template also includes one or more generative rules used to extract words, phrases, or text segments from embedded coding that match one or more formats defined by the generative rules in the candidate templates. For example, a generative rule may specify that text displayed in a "<figcaption>" tag pair located below an image should be extracted. Another generative rule may specify that the same text should be only extracted if the image has a height greater than 200 pixels and a JPEG file format. Yet another generative rule may specify that text after a text fragment "Image of" should be extracted if the text is contained in "<figcaption>" tag pairs. Yet another generative rule may specify that the most common entity (e.g., word or phrase) found in the document should be extracted.

A template evaluation module 212 evaluates the candidate templates and selects from the candidate templates that satisfy one or more filtering criteria. Evaluating candidate templates includes validating the candidate templates and evaluating the validated candidate templates.

Validating a candidate template includes determining whether the candidate template meaningfully relates to content of the website, or is rare. The candidate template may be rare, for instance, if the candidate template does not appear in at least a threshold number of documents. Evaluating a candidate template includes determining a likelihood that the candidate template can generate valid descriptive text for images.

In some implementations, a candidate template is validated only if the candidate template matches other documents. The candidate template is supported by other documents if similar structures are present in sufficient numbers on other documents in the set, e.g., in documents hosted on the website. To validate a candidate template, the template evaluation module 212 compares the candidate template to other documents 216 that share some traits, e.g., share the same hosting website, with the document in the descriptor-document-image tuple and attempts to identify the candidate template in other structured documents. In some implementations, the comparison is performed on HTML documents hosted on or generated from a same website that hosted or generated the original document. The comparison can identify matches, and exclude those templates that have no match or do not have sufficient number of matches in the other documents 216. For example, candidate templates that match only one document can be discarded.

To identify and exclude relatively rare candidate templates, the template evaluation module 212 applies various template validation rules 213. The template validation rules 213 specify a threshold number of appearances for a website. Candidate templates that appear in the website for more than the threshold number of times are designated as valid templates. A candidate template is excluded if a total number of appearances of the candidate template fail to satisfy the threshold number. The threshold number can vary, depending on a size of the website. In some implementations, the threshold number is proportional to the size of the website. In some implementations, the size of the website is measured by a total number of documents hosted on or generated from the website, or by a sum of document sizes of the website, or a combination of the two.

In addition to validating the candidate templates, the template evaluation module 212 further evaluates the validated candidate templates using additional template evaluation rules 215. The further evaluation can be performed by applying the candidate templates to the other documents 216. Evaluating the candidate templates can include aggregating all the candidate templates, and calculating a template performance score. In some implementations, the template performance score measures how many times the candidate templates appear in all documents of the website. For example, the template evaluation module 212 can apply a particular candidate template to all documents 216 of a particular website and count the number of times the template appears in the particular website.

In some implementations, aggregating candidate templates includes revising constraints in the candidate templates while performing the evaluation. Revising the constraints causes structurally similar candidate templates to be merged together and counted together. A minimum count value can be standardized such that candidate templates have constraint in common except the minimum count can be unified. For example, the template evaluation module 212 can merge two candidate templates that are similar, excepting image file types.

The template evaluation module 212 then applies a threshold value as defined in template evaluation rules 215. The threshold value is a cut-off value. When the template performance score of a candidate template (e.g., a count of a candidate template) satisfies the value, the candidate template is deemed an acceptable template. In some implementations, the threshold value is calculated based on a size of the website where documents 206 and 216 are hosted. For example, the threshold value can be a logarithm value of the size of the website plus a constant. Alternatively, the threshold value can also be a fixed number. Candidate templates that have counts satisfying the threshold are accepted to generate descriptive text for images, while the other candidate templates that fail to satisfy the threshold are discarded.

After validation and evaluation, a template application module 218 applies the remaining accepted templates to each of documents 220 having a same trait, e.g., hosted on a same website. Text content in structures described in the templates is extracted from documents 220. For example, an accepted template may have a generative rule that specifies that text included in "<figcaption>" tag pairs that are below an image should be extracted from documents having a structure that matches the template. The template application module 218 can determine that a particular document has a structure that matches the structure of the accepted template, extract text included in the "<figcaption>" tag pairs, and generate descriptive text for the image, as described below with reference to FIG. 7.

A descriptive text evaluation module 222 can evaluate candidate descriptive text generated for an image. For example, the descriptive text evaluation module 222 may provide a user interface for users to validate the descriptive text for an image. If the user indicates that the descriptive text matches the image, the descriptive text 228 can be stored in the image index 126 with a reference to the image. The descriptive text evaluation module 222 may also enable users to modify the descriptive text 228 before storing the text in the image index 126.

Alternatively or in addition, the descriptive text evaluation module 222 may also compare the descriptive text to labels or other descriptive text for the image. If the descriptive text is similar to the labels or other descriptive text, the descriptive text 228 may be stored in the image index 126 with a reference to the image. Otherwise, the descriptive text may be discarded.

Query Template Structure and Generation

Figure 3:
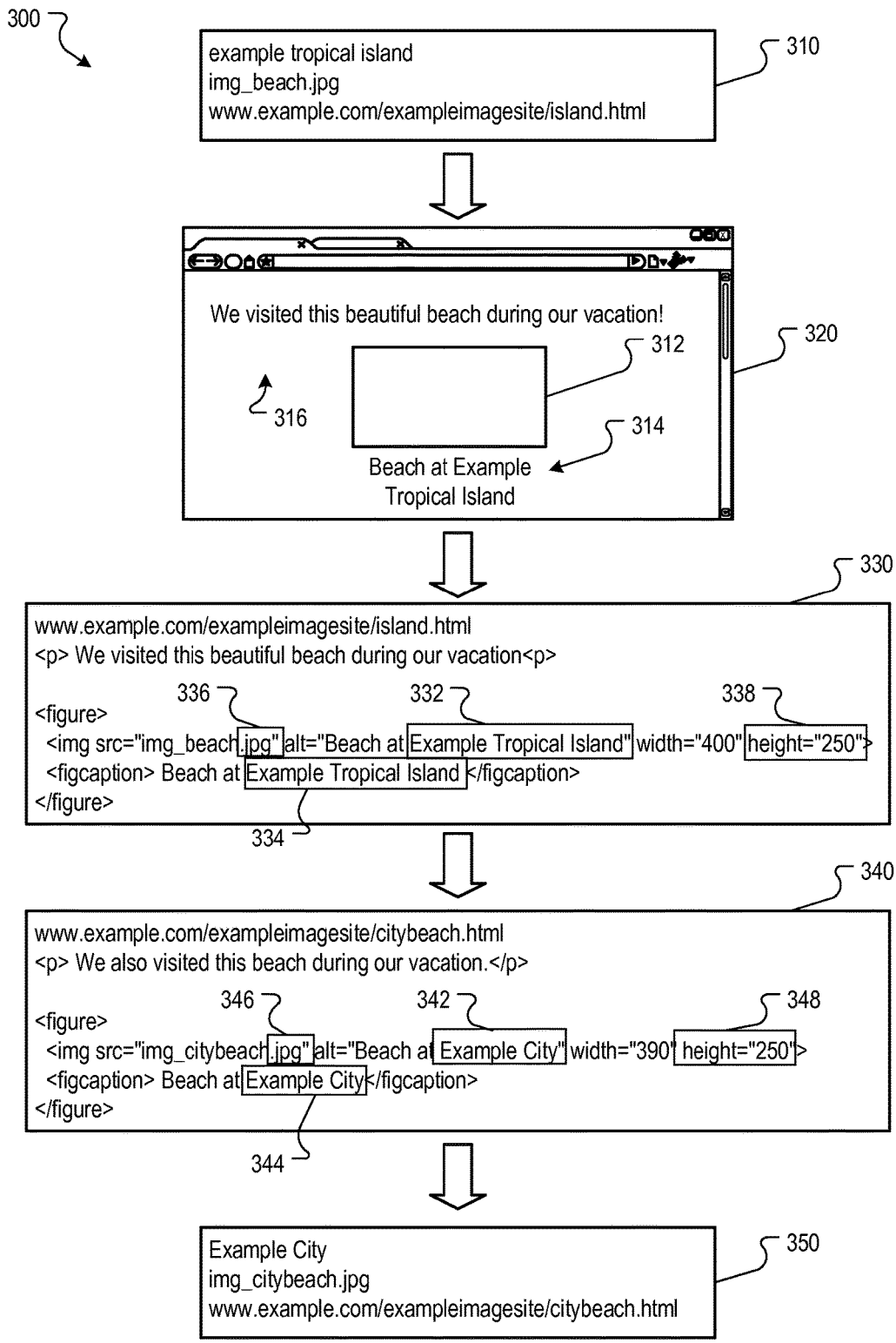
FIG. 3 is a block diagram of an example implementation of descriptive text generation techniques using structural similarity between documents having images and based on literals.

FIG. 3 is a block diagram 300 of an example implementation of descriptive text generation techniques using structural similarity between documents having images and based on literals. Literals, as used in context of identifying coding segments and other structure information for generating descriptive text, include strings of words, phrases, or text segments. In some implementations, at least portions of the strings of literals are parts of the existing descriptors, parts of the documents associated with the descriptors, e.g., documents included in descriptor-document-image tuples that contain the descriptors, or both.

Box 310 includes an example descriptor-document-image tuple. The image, "img_beach.jpg," in the example tuple may be an image for which one or more seed descriptors are available. The seed descriptor in the descriptor-document-image tuple is a seed descriptor associated with the image. For example, the seed descriptor may include one or more descriptor terms that describe the image. In this example, the seed descriptor includes descriptor terms "Example Tropical Island." The document in the descriptor-document-image tuple can be a document that includes the image of the tuple, e.g., an HTML document, or a reference to a document that includes the image of the tuple, the reference being a URL. For example, the particular document at the URL "www.example.com/exampleimagesite/island.html" includes the image "img_beach.jpg." The URL in the descriptor-document-image tuple of box 310 can link to static document content, e.g., a static HTML document, or dynamic document content, e.g., an HTML page generated on a server associated with domain name "example.com" using JSP. Both static and dynamic content can include dynamic elements, e.g., scripts, that, when executed, performs certain tasks, including, for example, generating customized information on a display or making the displayed content responsive to user actions. Both the static and dynamic content can be structured content that included embedded coding.

Box 320 illustrates content of the document located at the URL "www.example.com/exampleimagesite/island.html." In particular, the content includes the image "img_beach.jpg" 312, text 314 located below the image 312, and text 316 located above the image 312. The example text 314 is a caption for the image 312, and the example text 316 is textual content of the document.

Box 330 illustrates embedded coding fragments identified from the document of the descriptor-document-image tuple using the descriptor. A descriptive text generation system, e.g., the descriptive text system 120 of FIG. 1, can include various rules for extracting coding fragments of structures, e.g., embedded coding fragments, from the received document. An example rule can specify that the descriptive text generation system shall identify an embedded coding fragment, e.g., content enclosed by a pair of HTML tags including the tags themselves, if the embedded coding fragment includes one or more terms of the seed descriptor, e.g., if the embedded coding fragment includes one or more of "Example," "Tropical," and "Island."

In the example given in Box 330, two instances of text that matches the seed descriptor are found. A first instance is found in the tags for the image's source, "<img src="img_beach.jpg" alt="Beach at Example Tropical Island" width="400" height="250">" as it includes text 332 that matches the seed descriptor. A second instance is found in the tags for the image's caption, "<figcaption> Beach at Example Tropical Island </figcaption>", as it includes text 334 that matches the seed descriptor. A rule can specify that, for each instance of matching text, the tags enclosing the text 332 and 334, and all the enclosed text, be extracted as an embedded coding fragment.

Based on each embedded coding fragment, the descriptive text generation system creates a template. In some implementations, the templates can include generative rules to generate descriptive text for other images. For example, a template "template 1" can specify text in the position of the text 332 for embedded coding fragments of similar structure be extracted from other documents to generate descriptive text for images in the documents. Similarly, a template "template 2" can specify text in the position of the text 334 for embedded coding fragments of similar structure be extracted from other documents to generate descriptive text for images in the documents.

The templates can also specify that a particular structure of another document must match the particular structure of the template. For example, template 1 may specify that text at the position of text 332 only be extracted if the text is contained in "<img src>" tags and is located below the image. Similarly, template 2 may specify that text at the position of text 334 only be extracted if the text is contained in "<figcaption>" tags and is located below the image.

The templates can also specify that feature values for features of the images in other documents match feature values of particular features of the image for which the template was generated. For example, templates 1 and 2 may both specify that the image must have a height that matches the height 338 of the image and/or be stored in a file type that matches the file type 336 of the image. Thus, if another document has a similar structure to that of the structure of template 1, but the image is not stored in a JPEG file format, the template generation system may not generate descriptive text for the image, in this example. Table 1 below provides example generative rules, in pseudo code form, for the example templates 1 and 2.

TABLE 1

Example Generative Rules

| Template 1 Generative Rule | Template 2 Generative Rule |
| --- | --- |
| Extract text contained in "<img src>" tags between "Beaches at" and "width=" if the text is located below the image, the image file is ".jpg" and the image height is "250" | Extract text contained in "<figcaption>" tags between "Beaches at" and the tag "</figcaption>" if the text is located below the image, the image file is ".jpg" and the image height is "250" |

Box 340 illustrates an application of the candidate templates to other documents. Applying the templates to other documents can include identifying embedded coding being structurally similar to the embedded coding specified by the template. In some implementations, two pieces of embedded coding can be structurally similar when the two pieces of embedded coding are the same except for portions containing the identified text. For example, in the example given in Box 340, the following segments of tagged text is identified from the document (as identified by the URL "www.example.com/exampleimagesite/citybeach.html":

Segment for Template 1: <img src="img_citybeach.jpg" alt="Beach at Example City" width="390" height="250">

Segment for Template 2: <figcaption> Beach at Example City</figcaption>

The descriptive text generation system can identify the text above by determining that the structure of the document matches that of template 1 and/or template 2. For example, the descriptive text generation system can determine that the image "img_citybeach" has a height 348 that matches that of the height 338 specified by template 1 and is stored in a JPEG file 346 as specified by template 1. The query generation system can also determine that the text is contained in "<img src>" tags that are located below the image "img_citybeach>" and that contains text between "Beach at" and "width=". In response, the descriptive text generation system can extract from the segment for template 1, the text between "Beach at" and "width=", namely the text "Example City" 342. The descriptive text generation system can create descriptive text that is or includes the text "Example City" for the image "img_citybeach."

Similarly, the descriptive text generation system can determine that the image "img_citybeach" has a height 348 that matches that of the height 338 specified by template 2 and is stored in a JPEG file as specified by template 2. The query generation system can also determine that the text is contained in "<figcaption>" tags that are located below the image "img_citybeach>" and that contains text between "Beach at" and the closing tag "</figcaption>". In response, the descriptive text generation system can extract from the segment for template 2, the text between "Beach at" and "</figcaption>", namely the text "Example City" 344. The descriptive text generation system can create descriptive text that is or includes the text "Example City" for the image "img_citybeach."

Box 350 illustrates the descriptive text "Example City" generated for the image "img_citybeach" using the example templates, template 1 and template 2. The descriptive text can be associated with the image and/or the document, for example in an image index 126.

In some implementations, the document from which the descriptive text is generated share similar traits with the document from which the templates are identified. The traits can include being hosted by a common website. For example, the two documents as shown in FIG. 3 are both hosted on a website identified by domain name "example.com."

Figure 4:
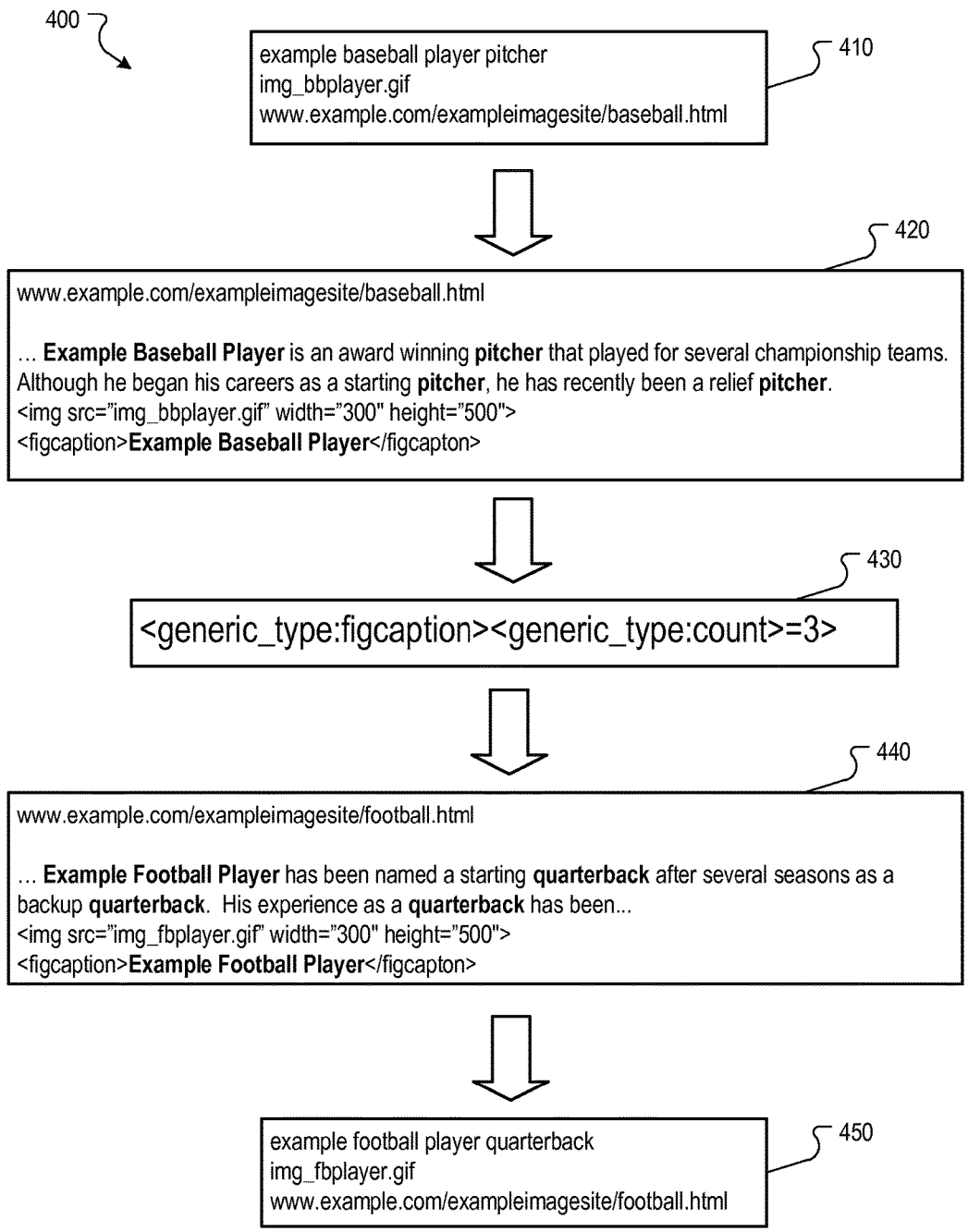
FIG. 4 is a block diagram of an example implementation of descriptive text generation techniques using structural similarity between documents having images and based on wildcards.

FIG. 4 is a block diagram 400 of an example implementation of descriptive text generation techniques using structural similarity between documents having images and based on wildcards. In addition to literals, wildcards can be used in generating descriptive text for images. A wildcard can include specific descriptions of where a text segment is located, e.g., in a <figure> tag or a <figcaption> tag, and characteristics specifying how the text segments are located in a document, e.g., a particular segment that has appeared in a document three times.

Box 410 includes an example descriptor-document-image tuple. The seed descriptor includes descriptor terms "example baseball player pitcher." The seed descriptor can be associated with an image "img_bbplyaer.gif" included in a document identified by URL "www.example.com/exampleimagesite/baseball.html."

Box 420 illustrates matches between the descriptor terms of the seed descriptor and the document that satisfy certain identification rules. Words, phrases, and text segments are identified, and are represented in bold, when:
1. The words, phrases, and text segments appear in both the seed descriptor and the document; and
2. The distribution of the words, phrases, and text segments in the document matches certain patterns as specified by template generation rules.

The seed descriptor and the document both include descriptor terms "example baseball player" and "pitcher." In some implementations, each single word of the seed descriptor can form a descriptor term. For example, the descriptor terms can include "example," "baseball," "player," and "pitcher."

In box 420, distribution of the identified descriptor terms in the document can result in identifying embedded coding fragments that satisfy various template generation rules. For example, "example baseball player" and "pitcher" appear in the document following a pattern that at least one term appears in "<figcaption>" tags, and at least another term appears three or more times in the document. In various implementations, template generation rules are specified to capture various patterns on how text appears in a document. Each descriptor-document-image tuple can be associated with numerous template generation rules. Based on these template generation rules, candidate templates can be generated. For example, a template generation rule can specify that a candidate template shall be generated if the document includes a structure that matches or is similar to the structure specified by the candidate template, e.g., the location of an image in the document matches the location of the image specified by the template, at least a part of the image's caption matches some descriptor terms, and if some descriptor terms appear multiple times in the document.

Box 430 illustrates an example template generated from the seed descriptor "example baseball player pitcher" and the image and document associated with the descriptor. The example template includes two sections: <generic type:

figcaption> and <generic type:count=3>, each section defining a structure. The part <generic type:figcaption> indicates that a match between the document and the descriptor exists in the <figcaption> tag pair of an HTML document. The term "generic type" specifies that a type of the component that exists in the <figcaption> tag is a generic type.

A wildcard has the form of <type> or <type:constraint>. The "type" portion can indicate a category of terms. A "generic type" type indicates a most general type that represents either a unigram or a known n-gram. The n-gram (e.g., "new york" or "example baseball player") can be determined by an external process. Other types are possible. The type of text can be determined by an external process. For example, a type can be date, number, or URL. "Generic type" can be a default type when information on other types is unavailable.

The "constraint" portion can indicate a document based context in which the specified type of text appears. The constraint can include a name of an HTML tag, e.g., <figure> or <figcaption>, which indicates that the type of text needs to appear in a section of the document that are enclosed by the HTML tag pair. If a wildcard does not have a "constraint" portion, e.g., the wildcard is "<generic type>", the wildcard can indicate any term that appears anywhere in the document. If the wildcard has a constraint portion that specifies "count>n," the terms are required to appear in the document more than n times. Therefore, for example, the second portion of the template as shown in box 430 "<generic type:count>=3>" can refer to any term that has a "generic-type", e.g., "pitcher", that appears in the document for three times or more, the term matching some portion of the descriptor.

The example template as shown in box 430 contains two sections. Each section contains a wildcard. A template can include an unlimited number of sections. Each section can be used to generate one or more text segments. The text segments can be concatenated or otherwise joined together to produce a descriptor.

In some implementations, the template can be associated with additional constraints based on characteristics of a wildcard. For example, if, during a course of training, a wildcard always, or frequently refers to rare terms, e.g., a term having IDF that is at or above a first threshold value, the wildcard can be configured such that the wildcard is not associated with a common term, e.g., a term having IDF that is at or below a second threshold value.

The descriptive text generation system creates the descriptive text by applying the template, e.g., the template as shown in box 430, to other documents, e.g., other documents hosted on or generated from website "example.com"). In box 440, the descriptive text generation system identifies portions of a document identified by the URL "www.example.com/exampleimagesite/football.html" that match the template. For example, a first text segment "Example Football Player" matches the first section of the template, when the text segment "Example Football Player" appears in a pair of <figcaption> and </figcaption> tags. Second text segment "quarterback" matches the second section of the template, because the segment "quarterback," has appeared three times in the document. Concatenating the first text segment and the second text segment, the descriptive text generation system can create the descriptive text "example football player quarterback" for the image "img_fbplayer.gif" as shown in box 450.

In some implementations, a descriptive text generation system combines the literals and wildcards described in FIG. 3 and FIG. 4 to produce templates. An example template that includes both literals and wildcards is described with respect to Tables 2 and 3. Table 2 includes example existing descriptors associated with an image included in a document (e.g., an example webpage "www.example.com/exampleimagesite/baseball.html"):

TABLE 2

Descriptive Text Relating to a Particular Image example baseball player
example baseball pitcher
baseball player Atlanta
example pitcher Atlanta
baseball pitcher Atlanta Table 3 shows an example set of candidate templates. The templates can contain one or more sections, and each section can be a literal or a wildcard.

TABLE 3

Example Candidate Templates

| Candidate Template | Wildcard Portion(s) | Literal Portion |
|---|---|---|
| <generic type:figcaption> | <generic type:figcaption> | — |
| <generic type:figcaption> "example baseball player" | <generic type:figcaption> | "example baseball player" |
| <generic type:figure> <location:count>=7> | <generic type:figure> <location:count>=7> | — |
| <generic type:count>=7> "baseball player" | <generic type:count>=7> | "baseball player" |

Example Process for Identifying Descriptive Text

Figure 5:
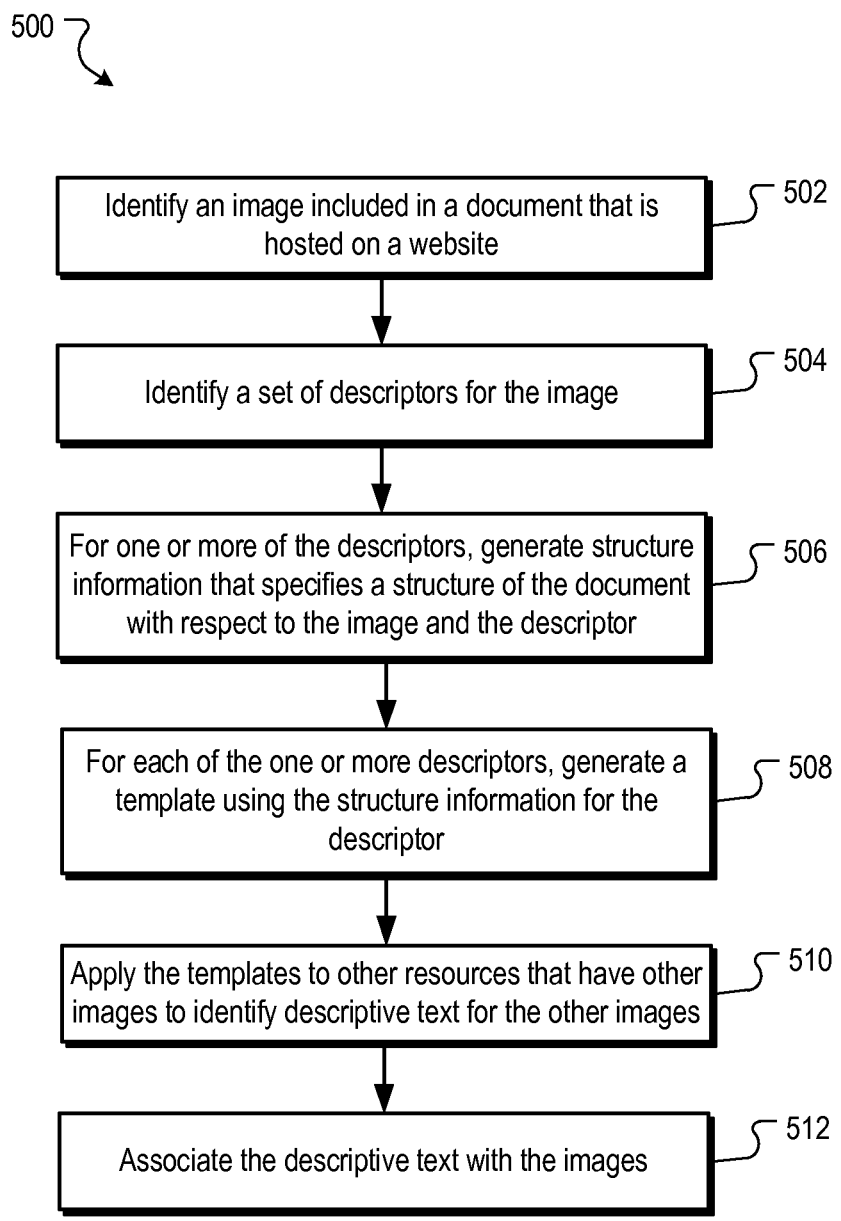
FIG. 5 is a flow chart of an example process for generating descriptive text for images and associating the descriptive text with the images.

FIG. 5 is a flow chart of an example process 500 for identifying descriptive text for images and associating the descriptive text with the images. For convenience, the example process 500 is described in reference to a system implementing the example process 400. The system can include, for example, the descriptive text system 120 of FIG. 1 or the descriptive text system 200 of FIG. 2.

The system identifies an image included in a document that is hosted on a website (502). For example, the system may obtain a descriptor-document-image tuple that identifies a document having an image and descriptors for the image. By way of another example, the system may access a document corpus, such as the document corpus 122, to retrieve a document that includes an image for which seed descriptors are available. The document may be an HTML document, an XML document, a dynamic document, e.g., generated using JSP or PHP technologies, another type of structured document, or other type of document.

Regardless of the type of document, the document can include embedded coding. The embedded coding describes various structures within the document. For example, if the document is an HTML document, the document may include HTML tags.

The system identifies a set of descriptors for the image (504). The system may access an image index, such as the image index 126, to retrieve the set of descriptors for the image. As described above, a seed descriptor for an image includes text related to or descriptive of the image. Each seed descriptor can include one or more terms that together describe the image.

For one or more of the descriptors, the system generates structure information that specifies a structure of the document with respect to the image and the seed descriptor. The structure information can specify the location of the image within the document, the location of the text that matches the seed descriptor, and/or features of the image. The structure information can also specify embedded coding fragments of the document and additional text included in the embedded coding fragments.

To generate the structure information, the system can identify the location of the image within the document and features of the image. As described above, the features of the image can include visual characteristics of the image and/or characteristics of a file in which the image is stored. The system, or another system, can perform an image analysis process to identify feature values for visual features of the image.

The system can also identify embedded coding fragments from the document and the descriptor and include the identified embedded coding fragments in the structure information. Identifying the embedded coding fragment can include identifying various matches between components of a structure in the document and one or more terms in the seed descriptor. For example, identifying the embedded coding fragments from the document can include identifying an HTML tag pair, where at least a portion of content enclosed by the HTML tag pair matches terms of the descriptor.

The system can also identify additional text and include the additional text in the structure information. The additional text may be text fragments enclosed in the HTML tag pair that does not match the descriptor. For example, the HTML tag pair may enclose the text "Image of Example City," where Example City is the descriptor. The system may also include the text fragment "Image of" in the structure information as it may be helpful in identifying descriptive text for other images.

The system can also identify the location of the embedded coding fragments and/or text that matches the seed descriptor. This location may be with respect to the image. For example, the location information may specify that the embedded coding fragment or text is located above or below the image, or to a particular side of the seed descriptor. The location information may also specify the distance between the image and the embedded coding fragment or text, for example in number of pixels.

The system generates a template for each seed descriptor using the structure information for the descriptor (508). As described above, a template can include image location information that specifies the location of the image within the document, document structure information specifying the structure of the document with respect to the image and the descriptor, and/or image feature information that specifies one or more feature values for features of the image. The document structure information may include text location information that specifies the location of text that matches the descriptor. Each template can also include one or more generative rules for generating descriptive text from another document based on the image location information, the document structure information, and/or the image feature information. A template can also include information specifying a literal to associate with images found in a document.

The system applies the templates to other documents that include other images to identify descriptive text for the other images (510). The system may apply the templates to other documents that have traits similar to those of the document from which the templates were generated. For example, the system may apply the templates to documents hosted in the same website at the document from which the templates were generated.

Figure 7:
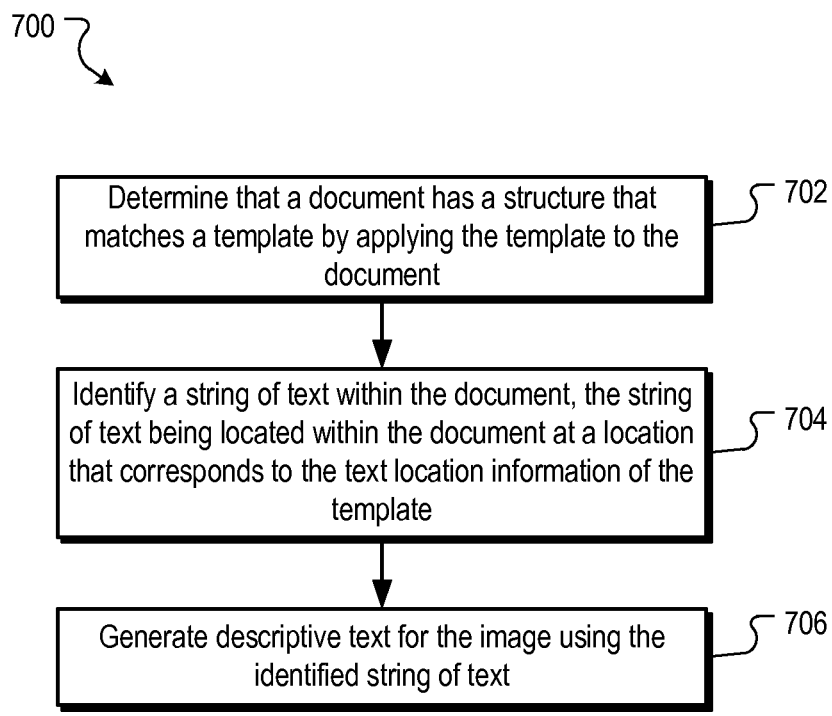
FIG. 7 is a flow chart of an example process for generating descriptive text for an image by applying a template to a document that includes the image.

Applying a template to a particular document can include identifying text in the particular document that is located within the particular document at a location that corresponds to the text location information of the template. The system can extract the identified text and generate a descriptor based on the extracted text. An example process for generating descriptive text for an image by applying a template to a document that includes the image is illustrated in FIG. 7 and described below.

The system associates the descriptive text with the images (512). For example, the system may store the descriptors in an image index with a reference to the corresponding images. Thereafter, the descriptors can be used by a search system, for example as part of an image search operation.

Example Process for Generating Structure Information

Figure 6:
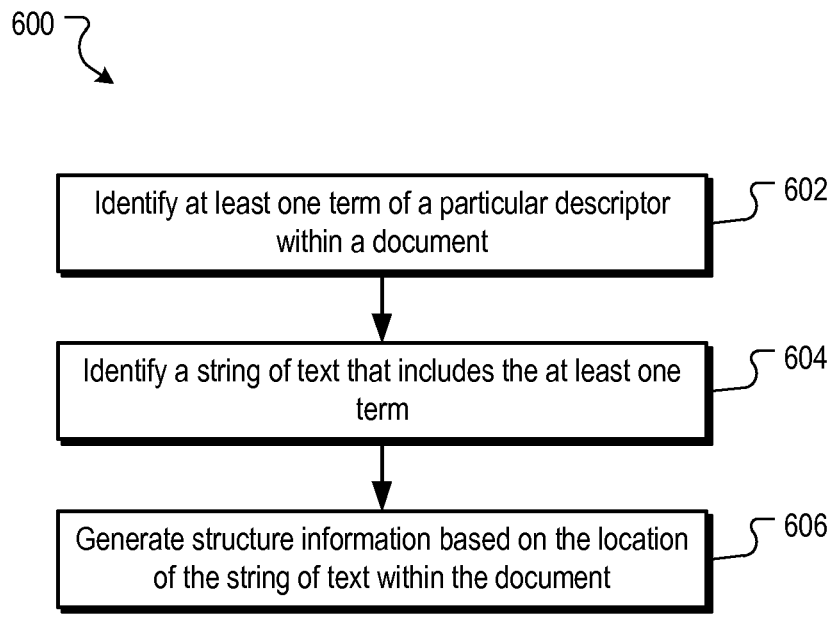
FIG. 6 is a flow chart of an example process for generating structure information for a document using a seed descriptor.

FIG. 6 is a flow chart of an example process 600 for generating structure information for a document using a descriptor. For convenience, the example process 600 is described in reference to a system implementing the example process 600. The system can include, for example, the descriptive text system 120 of FIG. 1 or the template generation module 208 of FIG. 2.

The system identifies one or more terms of a particular seed descriptor within a document that includes an image that corresponds to the particular seed descriptor (602). For example, the system may search the document for each term of the seed descriptor and identify each portion of the document that includes text that matches one or more terms of the seed descriptor.

A string of text that includes the one or more identified terms is identified (604). The string of text may be the identified term(s) or the identified term(s) and additional text. For example, if the descriptor is "Example Tropical Island," the system may identify strings of text, such as "Tropical Island," "Beaches at Tropical Island," or "Example Island."

The additional text may be used in a template, for example as part of a generative rule, to determine the boundaries of text to extract from other documents. For example, if another document included the text "Beaches at Caribbean Island," then the system may extract the text "Caribbean Island" due to the phrase "Beaches at" being to the left of the descriptor in the string of text "Beaches at Tropical Island."

Structure information is generated based on the location of the string of text (606). The structure information may also be generated based on the location of the image. For example, the system may identify the location of the image and the location of the string of text in the document. The location of the string of text may be with respect to the image. For example, the location of the text may be described as being above, below or to one side of the image. The location may also be described in terms of distance from the image, for example in pixels. As described above, structure information can also include image feature information describing features of the image.

Example Process for Generating Descriptive Text for an Image

FIG. 7 is a flow chart of an example process 700 for generating descriptive text for an image by applying a template to a document that includes the image. For convenience, the example process 700 is described in reference to a system implementing the example process 700. The system can include, for example, the descriptive text system 120 of FIG. 1 or the template application module 218 of FIG. 2.

It is determined that a document has a structure that matches a template by applying the template to the document (702). The system may apply each element of the template to the document to determine whether the document has a structure that matches the template. For example, the system may evaluate the document to determine whether an image in the document is located in the position specified by image location information of the template.

The system may also evaluate the document to determine whether the document includes text at a location specified by resource structure information of the template. This structure information may specify that text should be contained in certain HTML tags and/or the location of the text within the document or with respect to the image.

The system may also evaluate the image in the document to determine whether it has feature values that match feature values specified by image feature information of the template. For example, the template may specify that the image must be stored in a GIF file and have a particular aspect ratio. The system may evaluate the image in the document to determine whether it is stored in a GIF file and has the particular aspect ratio.

One or more strings of text are identified within the document at a location that corresponds to the text location information of the template (704). For example, the text location information of the template may specify that the string of text is located in the document directly under the image in caption tags. The system may identify the caption tags under the image, and identify text contained in the caption tags. The text location information may also specify that the string of text is located in metadata for the image. The system may identify the metadata for the image, and identify text contained in the metadata.

Descriptive text is generated for an image using the identified string of text (706). For example, the system may extract the identified string of text and generate descriptive text for the image based on the extracted text. The descriptive text may be all or a portion less than all of the extracted text. For example the template may include wildcards for a portion of the string of text. Text included in the spaces defined by the wildcards may be included in the descriptive text, while the other text may be discarded. For example, the template may specify that the string "Beaches at &&" where the text "&&" is wildcards. The system would then extract matching text, such as "Beaches at Tropical Island." The portion in the place of the wildcards, "Tropical Island" may be used as the descriptive text, while the text "Beaches at" is discarded.

Example Process for Evaluating Candidate Templates

Figure 8:
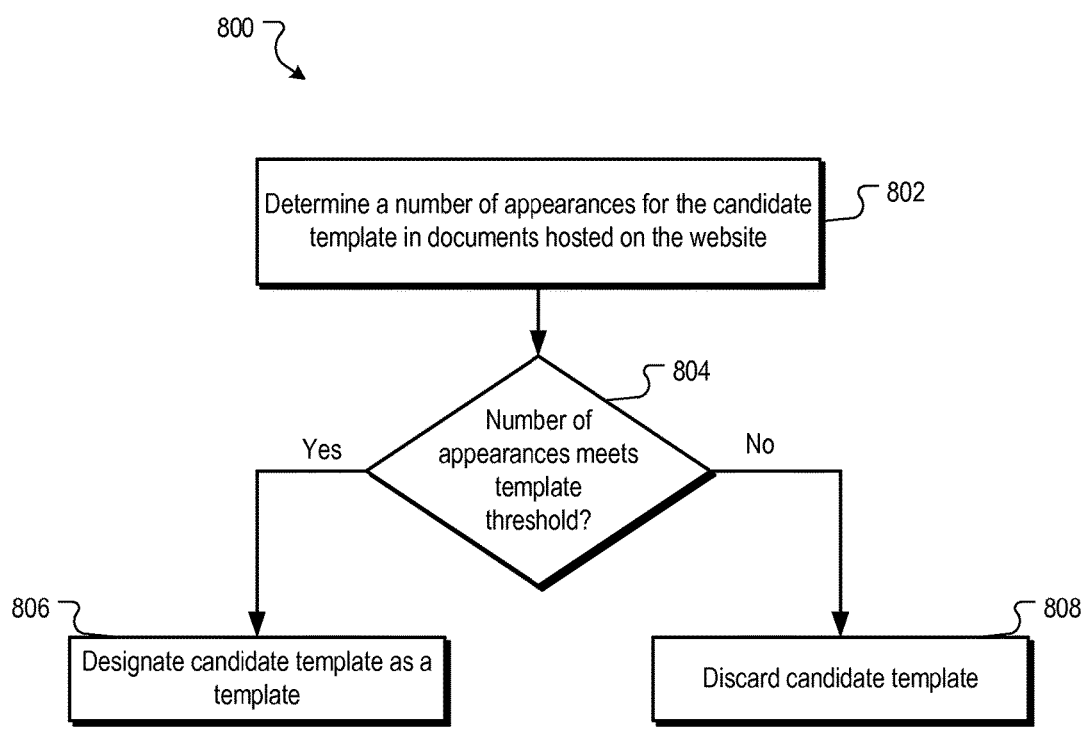
FIG. 8 is a flow chart of an example process for evaluating candidate templates.

FIG. 8 is a flow chart of an example process 800 for evaluating candidate templates. For convenience, the example process 800 is described in reference to a system implementing the example process 800. The system can include, for example, the descriptive text system 120 of FIG. 1 or the template evaluation module 212 of FIG. 2.

The system determines a number of appearances of a candidate template in documents hosted on a website (802). The candidate template may be a template generated from another document that is hosted on the website. The system may compare the structure of the candidate template to the structure of other documents hosted on the website. For each document that includes a structure that corresponds to, e.g., matches, the structure of the candidate template, the system may increment a count of the number of appearances to determine the total number of appearances for the candidate template.

The system can compare the number of appearances to a template threshold (804). The template threshold can have a value that is proportional to a total number of documents hosted on a website. In some implementations, the total number of documents is measured based on a number of document identifiers, e.g., URLs that contain the same domain name of the website. The template threshold value can be determined based on a logarithmic value of a size of the website.

If the number of appearances satisfies the template threshold, for example by exceeding the template threshold, the system may designate the candidate template as a template for use in generating descriptive text for other images (806). The system may also store the template in a template store, such as the template store 124. If the number of documents does not satisfy the template threshold, the system may discard the candidate template (808).

Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:

identifying a set of one or more seed descriptors for a given image in a given document that is hosted on a website, wherein each seed descriptor has been identified as being a correct description of the given image;

for each seed descriptor:

identifying a location of at least one word of the seed descriptor in the given document by comparing each word of the seed descriptor to text included in the given document;

in response to identifying the location of the at least one word of the seed descriptor in the given document, generating, based on the identified location of the at least one word of the seed descriptor in the given document, structure information that specifies a structure of the given document with respect to the given image and the seed descriptor, the structure specifying a location of a string of text that includes the at least one word of the seed descriptor within the given document with respect to a location of the given image within the given document; and generating one or more templates using the structure information for the seed descriptor, each template including:

image location information specifying a location of the given image within the given document;

document structure information specifying the structure of the given document with respect to the given image and the seed descriptor, including the location of the string of text that includes the at least one word of the seed descriptor within the given document with respect to the location of the given image within the given document;

image feature information specifying one or more feature values of the given image, each feature value representing a respective visual characteristic of the given image or data regarding an image file in which the given image is stored; and a generative rule that generates descriptive text for other images in other documents; and for each generated template:

identifying a set of documents that have (i) document structure information that matches the document structure information specified by the generated template and (ii) an image that has image feature information that matches the image feature information of the given image; and for each document in the set of documents:

generating descriptive text for the image of the document using the generative rule of the generated template and the document; and associating the descriptive text with the image.

2. The method of claim 1, wherein each template further includes text information that specifies a first portion of the string of text and a wildcard for a second portion of the string of text, the second portion of the string of text corresponding to at least one term of the string of text that matches at least one of the terms of the template's corresponding seed descriptor, and the first portion of the string of text being text that does not match a term of the seed descriptor.

3. The method of claim 1, wherein the seed descriptors are text data including one or more terms, and generating the structure information for a particular seed descriptor comprises:

identifying at least one term of the particular seed descriptor within the given document;

identifying a string of text that includes the at least one term of the particular seed descriptor; and generating the document structure information for the particular seed descriptor based on the location of the string of text that includes the at least one term of the particular seed descriptor within the given document.

4. The method of claim 3, wherein generating descriptive text for a particular image in a particular document comprises:

determining that the particular document has a structure that matches a particular template by applying the particular template to the particular document;

identifying a particular string of text within the particular document, the particular string of text being located within the particular document at a location that corresponds to the text location information of the particular template; and generating the descriptive text for the particular image using the particular string of text.

5. The method of claim 4, wherein determining that the particular document has a structure that matches the particular template comprises:

determining that the particular image is located within the particular document at a location that matches the location of the given image within the given document;

determining that particular string of text is located within the particular document at a location that matches the location of the string of text within the given document; and determining that the particular image includes one or more features that match the one or more features of the given image.

6. The method of claim 1, wherein generating, for each seed descriptor, one or more templates using the structure information for the seed descriptor comprises:

generating a plurality of candidate templates using the structure information for the seed descriptors;

for each candidate template:

determining a respective number of documents hosted on the website that have document structure information that matches the structure information of the document; and determining whether the respective number of documents meets a template threshold;

for each candidate template that has a respective number of documents that meets the template threshold:

designating the candidate template as a template; and using the candidate template to generating descriptive text for one or more images included in the documents hosted on the website;

for each candidate template that has a respective number of documents that does not meet the template threshold, determining to not use the candidate template to generate descriptive text for images included in the documents hosted on the website.

7. The method of claim 1, wherein the structure of the document includes at least one embedded coding fragment, each embedded coding fragment being a hypertext markup language (HTML) tag pair that encloses the given image or the string of text.

8. The method of claim 1, wherein the one or more features of the image comprises at least one of an aspect ratio for the given image, a display size for the given image, a shape of the given image, or data identifying cropping of the given image.

9. The method of claim 1, wherein the one or more features of the given image comprises at least one of a file name for the given image or a file type for the given image.

10. The method of claim 1, wherein each seed descriptor is a seed query that is a query that has at least a threshold performance with respect to the given image.

11. The method of claim 1, wherein the other documents include only documents that are hosted on the website.

12. The method of claim 1, wherein each seed descriptor comprises a seed query for which the given image is selected at a frequency that satisfies a threshold frequency when the given image is referenced by a search result provided in the response to the seed query.

13. The method of claim 1, further comprising generating at least one of the seed descriptors by applying visual features of the given image to an image classification model.

14. A non-transitory computer storage medium encoded with a computer program, the program comprising instructions that when executed by data processing apparatus cause the data processing apparatus to perform operations comprising:
- identifying a set of one or more seed descriptors for a given image in a given document that is hosted on a website, wherein each seed descriptor has been identified as being a correct description of the given image;
- for each seed descriptor:
  - identifying a location of at least one word of the seed descriptor in the given document by comparing each word of the seed descriptor to text included in the given document;
  - in response to identifying the location of the at least one word of the seed descriptor in the given document, generating, based on the identified location of the at least one word of the seed descriptor in the given document, structure information that specifies a structure of the given document with respect to the given image and the seed descriptor, the structure specifying a location of a string of text that includes the at least one word of the seed descriptor within the given document with respect to a location of the given image within the given document; and
  - generating one or more templates using the structure information for the seed descriptor, each template including:
    - image location information specifying a location of the given image within the given document;
    - document structure information specifying the structure of the given document with respect to the given image and the seed descriptor, including the location of the string of text that includes the at least one word of the seed descriptor within the given document with respect to the location of the given image within the given document;
    - image feature information specifying one or more feature values of the given image, each feature value representing a respective visual characteristic of the given image or data regarding an image file in which the given image is stored; and
    - a generative rule that generates descriptive text for other images in other documents; and
- for each generated template:
  - identifying a set of documents that have (i) document structure information that matches the document structure information specified by the generated template and (ii) an image that has image feature information that matches the image feature information of the given image; and
  - for each document in the set of documents:
    - generating descriptive text for the image of the document using the generative rule of the generated template and the document; and
    - associating the descriptive text with the image.

15. A system comprising:
a data processing apparatus; and
a memory storage apparatus in data communication with the data processing apparatus, the memory storage apparatus storing instructions executable by the data processing apparatus and that upon such execution cause the data processing apparatus to perform operations comprising:
- identifying a set of one or more seed descriptors for a given image in a given document that is hosted on a website, wherein each seed descriptor has been identified as being a correct description of the given image;
- for each seed descriptor:
  - identifying a location of at least one word of the seed descriptor in the given document by comparing each word of the seed descriptor to text included in the given document;
  - in response to identifying the location of the at least one word of the seed descriptor in the given document, generating, based on the identified location of the at least one word of the seed descriptor in the given document, structure information that specifies a structure of the given document with respect to the given image and the seed descriptor, the structure specifying a location of a string of text that includes the at least one word of the seed descriptor within the given document with respect to a location of the given image within the given document; and
  - generating one or more templates using the structure information for the seed descriptor, each template including:
    - image location information specifying a location of the given image within the given document;
    - document structure information specifying the structure of the given document with respect to the given image and the seed descriptor, including the location of the string of text that includes the at least one word of the seed descriptor within the given document with respect to the location of the given image within the given document;
    - image feature information specifying one or more feature values of the given image, each feature value representing a respective visual characteristic of the given image or data regarding an image file in which the given image is stored; and
    - a generative rule that generates descriptive text for other images in other documents; and
- for each generated template:
  - identifying a set of documents that have (i) document structure information that matches the structure information of the document and (ii) an image that has image feature information that matches the image feature information of the given image; and
  - for each document in the set of documents:
    - generating descriptive text for the image of the document using the generative rule of the generated template and the document; and
    - associating the descriptive text with the image.

16. The system of claim 15, wherein each template further includes text information that specifies a first portion of the string of text and a wildcard for a second portion of the string of text, the second portion of the string of text corresponding to at least one term of the string of text that matches at least one of the terms of the template's corresponding seed descriptor, and the first portion of the string of text being text that does not match a term of the seed descriptor.

17. The system of claim 15, wherein the seed descriptors are text data including one or more terms, and generating the structure information for a particular seed descriptor comprises:
- identifying at least one term of the particular seed descriptor within the given document;
- identifying a string of text that includes the at least one term of the particular seed descriptor; and
- generating the document structure information for the particular seed descriptor based on the location of the string of text that includes the at least one term of the particular seed descriptor within the given document.

* * * * *